United States Patent
Hendrickson et al.

(10) Patent No.: US 11,328,625 B2
(45) Date of Patent: May 10, 2022

(54) VESSEL CUTDOWN SIMULANT

(71) Applicant: SurgiReal Products, Inc., Loveland, CO (US)

(72) Inventors: Grahm J. Hendrickson, Fort Collins, CO (US); Dean A. Hendrickson, Fort Collins, CO (US)

(73) Assignee: SurgiReal Products, Inc., Loveland, CO (US)

( * ) Notice: Subject to any disclaimer, the term of this patent is extended or adjusted under 35 U.S.C. 154(b) by 374 days.

(21) Appl. No.: 16/114,107

(22) Filed: Aug. 27, 2018

(65) Prior Publication Data

US 2019/0066539 A1 Feb. 28, 2019

Related U.S. Application Data

(60) Provisional application No. 62/552,295, filed on Aug. 30, 2017.

(51) Int. Cl.
| | | |
|---|---|---|
| *G09B 23/30* | (2006.01) | |
| *G09B 23/28* | (2006.01) | |
| *G09B 19/24* | (2006.01) | |
| *G09B 23/32* | (2006.01) | |

(52) U.S. Cl.
CPC .......... *G09B 23/303* (2013.01); *G09B 19/24* (2013.01); *G09B 23/285* (2013.01); *G09B 23/32* (2013.01)

(58) Field of Classification Search
CPC .... G09B 23/303; G09B 19/24; G09B 23/285; G09B 23/32; G09B 23/28; G09B 23/30; G09B 23/34; G09B 23/306
USPC ........................................................ 434/268
See application file for complete search history.

(56) References Cited

U.S. PATENT DOCUMENTS

| | | | | |
|---|---|---|---|---|
| 7,931,471 | B2 * | 4/2011 | Senagore | G09B 23/285 434/267 |
| 8,613,621 | B2 | 12/2013 | Hendrickson et al. | |
| 8,708,707 | B2 | 4/2014 | Hendrickson et al. | |
| 9,514,658 | B1 * | 12/2016 | Hart | B29C 70/021 |
| 2008/0076101 | A1 * | 3/2008 | Hyde | G09B 23/30 434/272 |
| 2010/0167254 | A1 * | 7/2010 | Nguyen | G09B 23/30 434/272 |
| 2012/0015337 | A1 * | 1/2012 | Hendrickson | G09B 23/28 434/267 |
| 2012/0034587 | A1 * | 2/2012 | Toly | G09B 23/285 434/267 |
| 2012/0088215 | A1 | 4/2012 | Bellezzo et al. | |

(Continued)

OTHER PUBLICATIONS

U.S. Appl. No. 62/552,295, filed Aug. 30, 2017.
U.S. Appl. No. 15/299,693, filed Oct. 21, 2016.
U.S. Appl. No. 15/833,850, filed Dec. 6, 2017.

*Primary Examiner* — Robert P Bullington
(74) *Attorney, Agent, or Firm* — Craig R. Miles; CR Miles P.C.

(57) ABSTRACT

Disclosed herein are embodiments of a vessel cutdown simulant, and methods of making and using such a vessel cutdown simulant, whereby the vessel cutdown simulant includes a first layer; a second layer underlying the first layer, the second layer movably engaged with the first layer; a first conduit underlying the first layer; whereby the first layer, the second layer, and the first conduit together provide a simulated body tissue; and a housing including a side wall which defines an interior cavity configured to house the simulated body tissue.

20 Claims, 10 Drawing Sheets

(56) References Cited

U.S. PATENT DOCUMENTS

| | | | |
|---|---|---|---|
| 2013/0078603 A1* | 3/2013 | Yang | G09B 23/285 |
| | | | 434/268 |
| 2015/0031008 A1* | 1/2015 | Black | G09B 5/02 |
| | | | 434/272 |
| 2016/0247419 A1* | 8/2016 | Parry | G09B 9/003 |
| 2018/0190155 A1* | 7/2018 | Segall | A61B 17/0057 |
| 2019/0027066 A1* | 1/2019 | Altermatt Couratier | |
| | | | G09B 23/303 |

\* cited by examiner

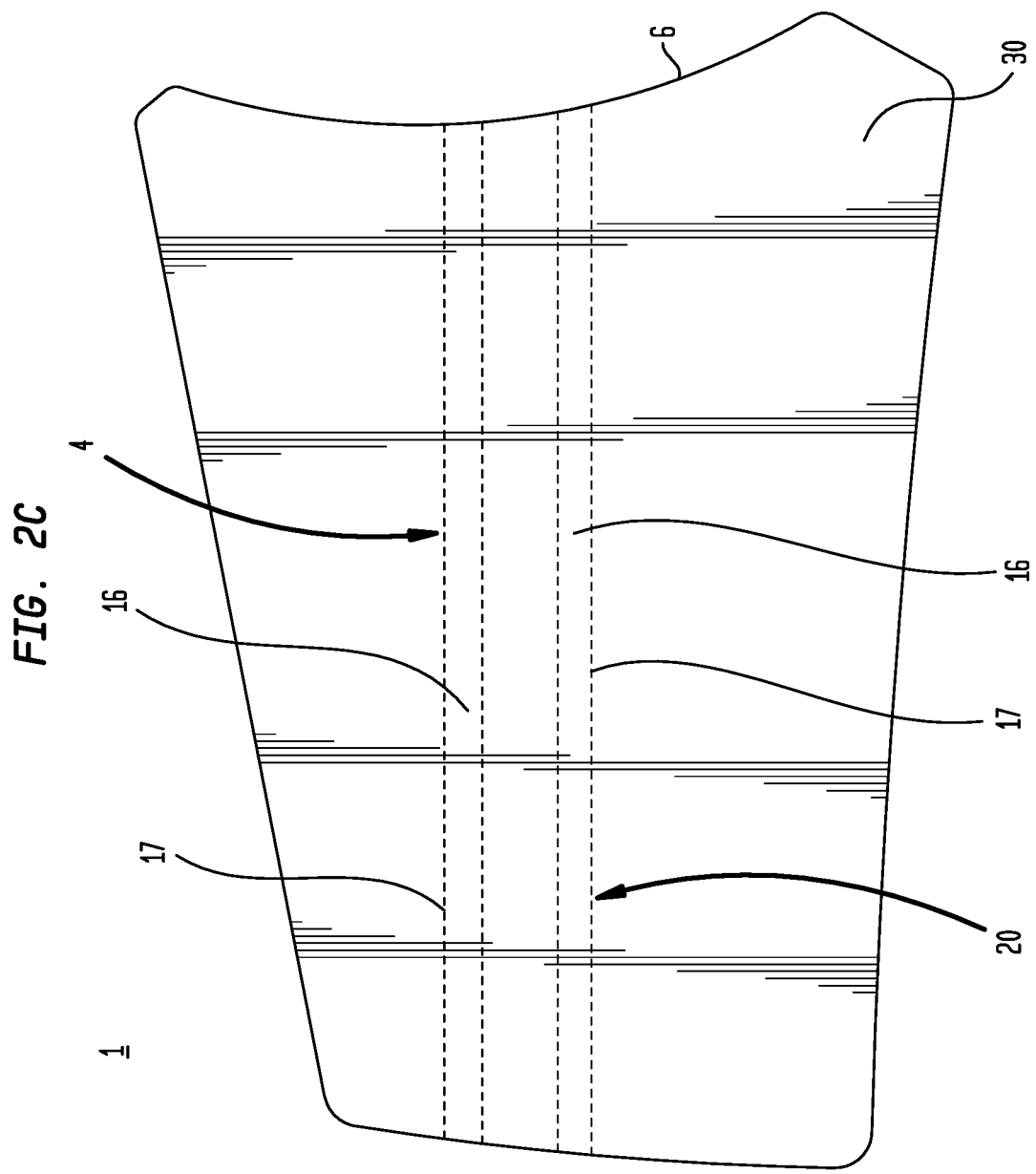

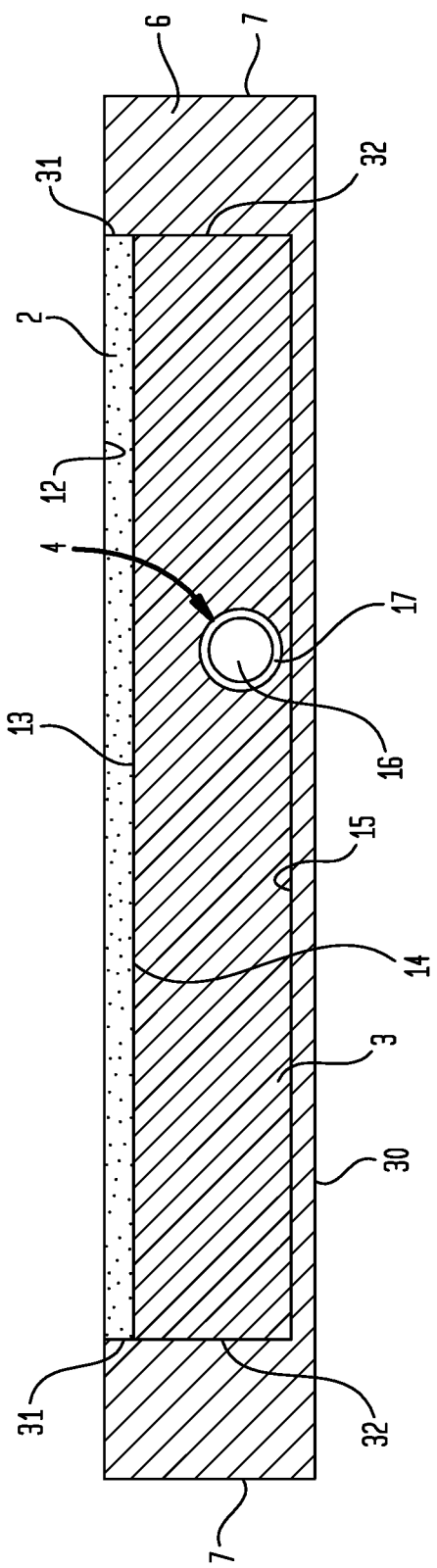

VESSEL CUTDOWN SIMULANT

This United States Non-Provisional patent application claims the benefit of U.S. Provisional Patent Application No. 62/552,295, filed Aug. 30, 2017, hereby incorporated by reference herein.

I. SUMMARY OF THE INVENTION

A broad object of a particular embodiment of the invention can be to provide a vessel cutdown simulant, and methods of making and using such a vessel cutdown simulant, whereby the vessel cutdown simulant comprises a first layer; a second layer underlying the first layer, the second layer movably engaged with the first layer; a first conduit underlying the first layer; whereby the first layer, the second layer, and the first conduit together provide a simulated body tissue; and a housing including a side wall which defines an interior cavity configured to house the simulated body tissue.

Naturally, further objects of the invention are disclosed throughout other areas of the specification, drawings, and claims.

II. A BRIEF DESCRIPTION OF THE DRAWINGS

FIG. 2C is a bottom view of the particular embodiment of the vessel cutdown simulant shown in FIG. 2A, whereby the first and second conduits are shown in broken line.

FIG. 3 is a cross sectional view of a particular embodiment of the vessel cutdown simulant having a first layer, a second layer, and a first conduit.

III. DETAILED DESCRIPTION OF THE PREFERRED EMBODIMENTS

Figure 1A:
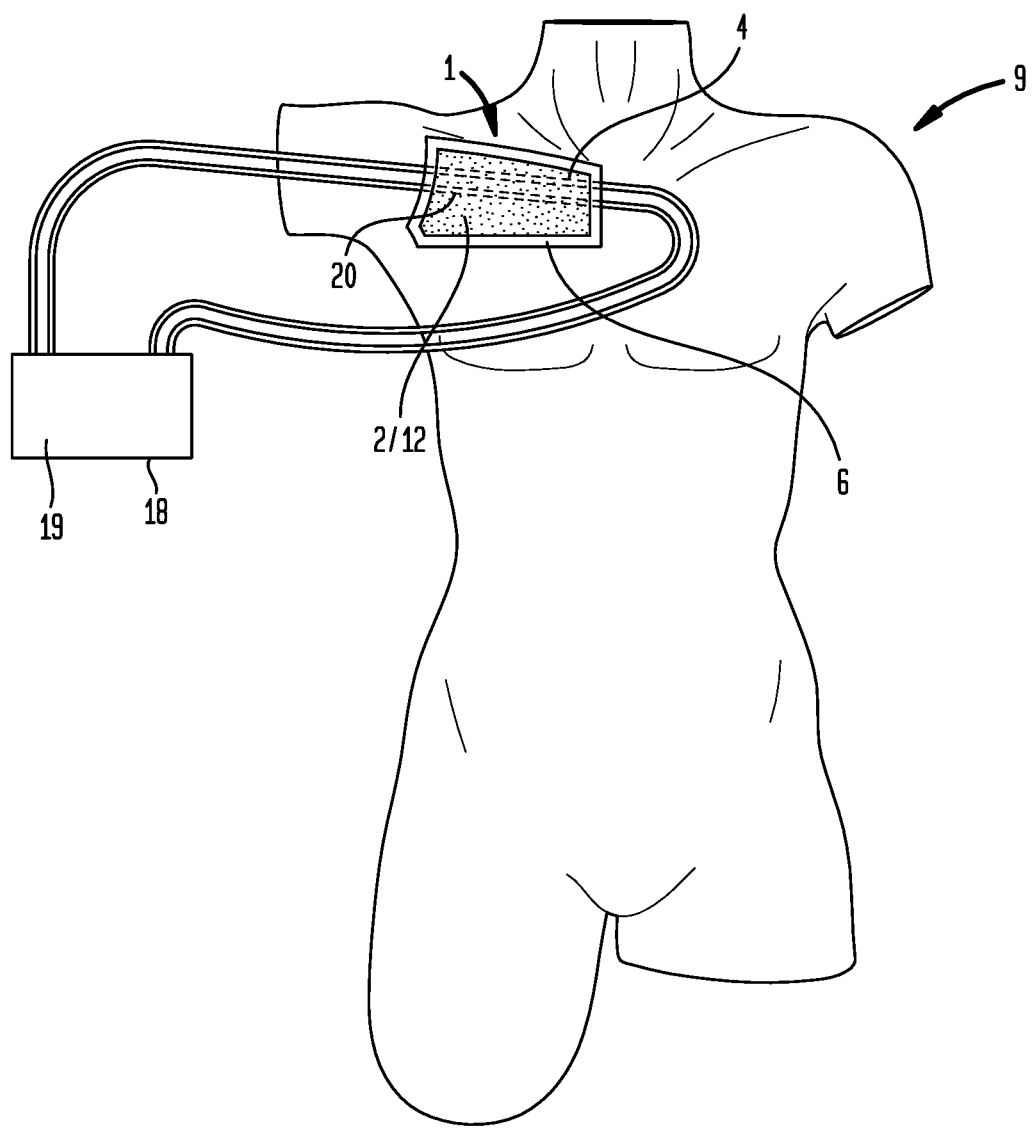
FIG. 1A is an illustration of a method of using a particular embodiment of the vessel cutdown simulant to practice a procedure, such as a right axillary artery cutdown, on a model.
Figure 1B:
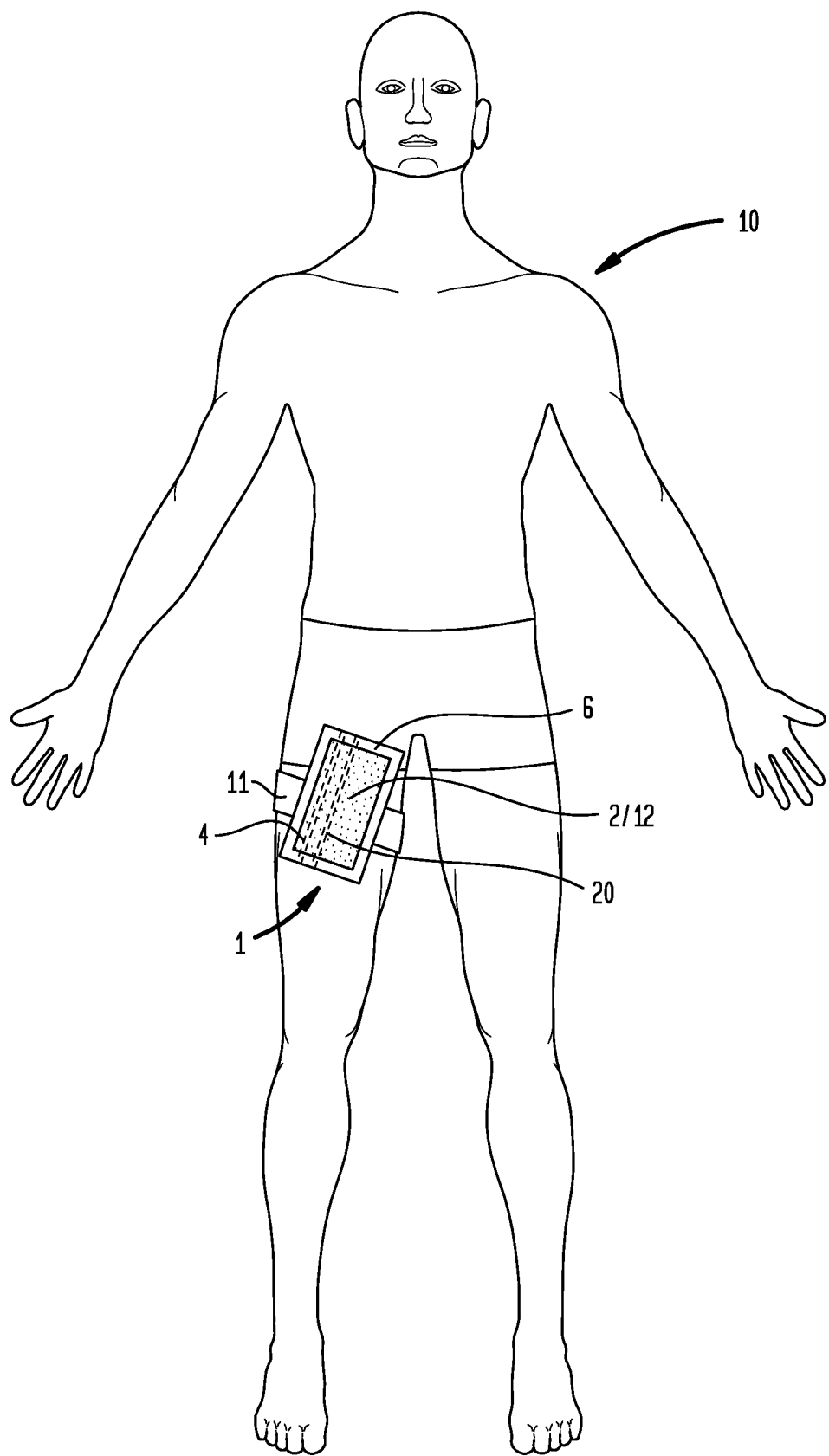
FIG. 1B is an illustration of a method of using a particular embodiment of the vessel cutdown simulant to practice a procedure, such as a right femoral artery cutdown, on a wearer wearing the vessel cutdown simulant.
Figure 2A:
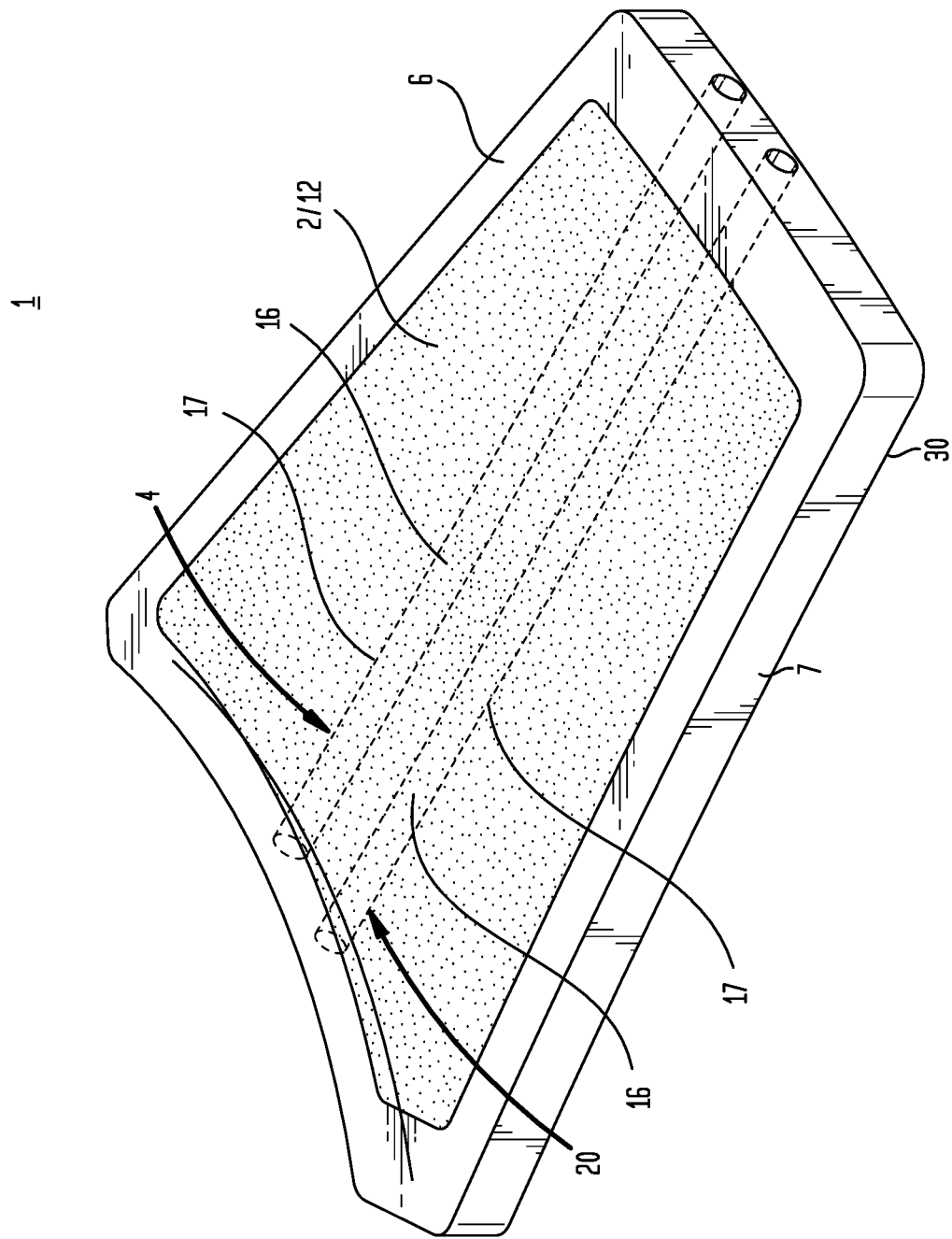
FIG. 2A is a perspective view of a particular embodiment of the vessel cutdown simulant, whereby the first and second conduits are shown in broken line.
Figure 2B:
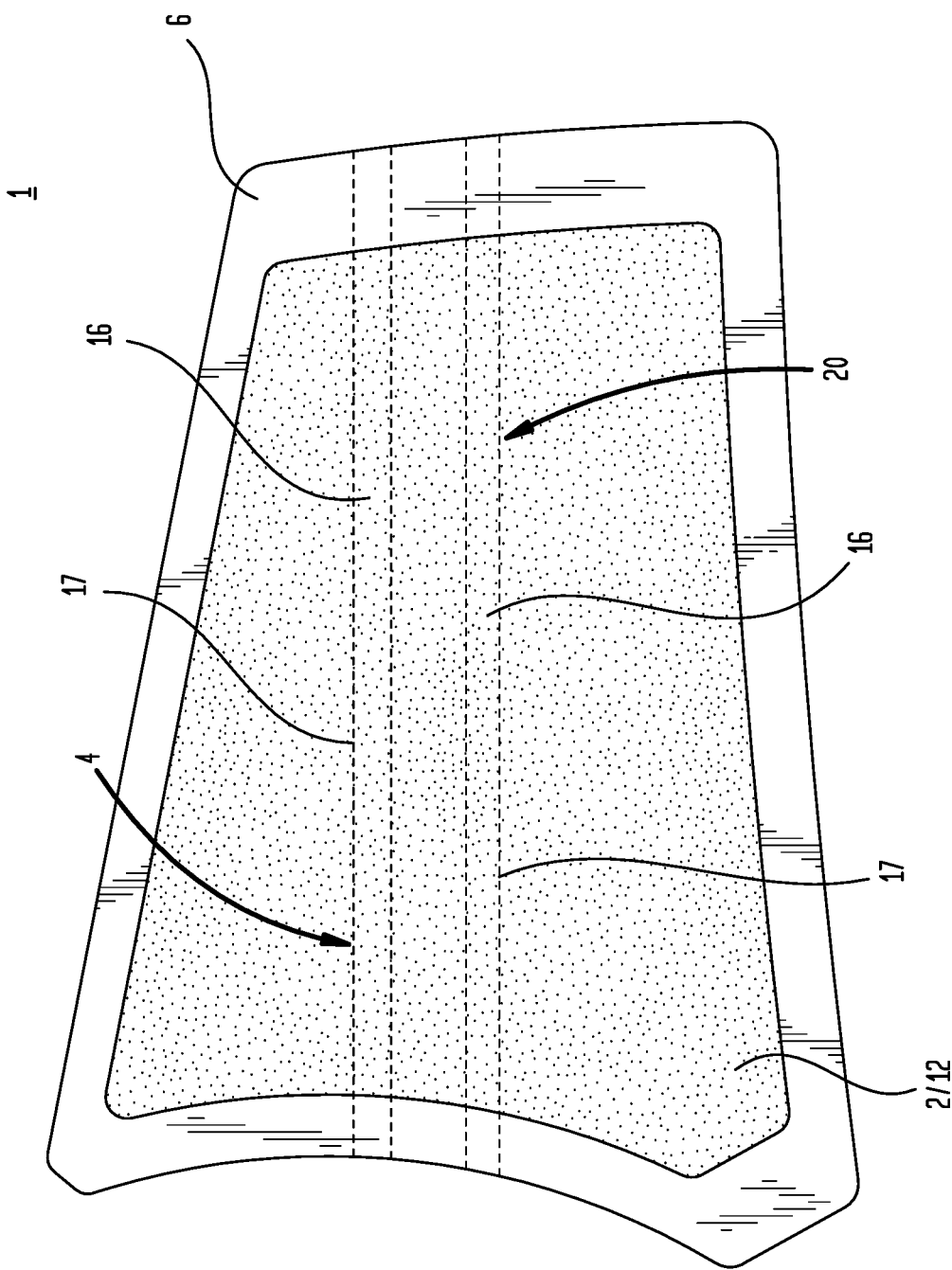
FIG. 2B is a top view of the particular embodiment of the vessel cutdown simulant shown in FIG. 2A, whereby the first and second conduits are shown in broken line.
Figure 2D:
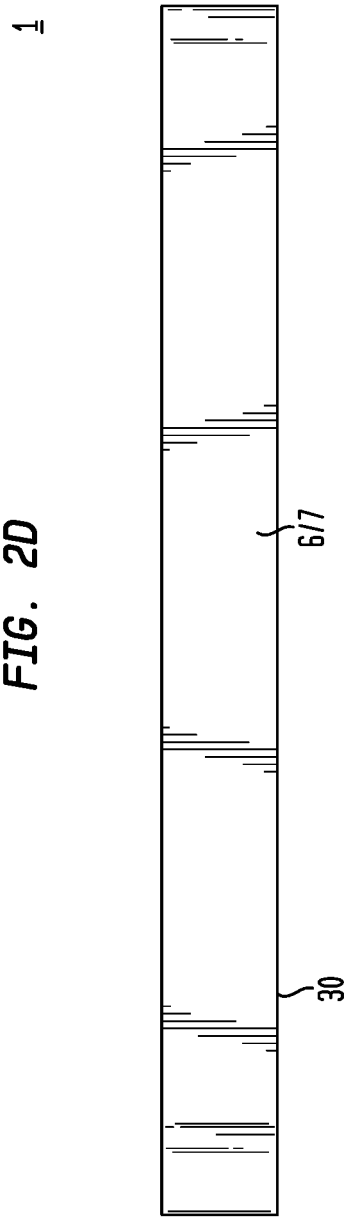
FIG. 2D is a front view of the particular embodiment of the vessel cutdown simulant shown in FIG. 2A, whereby the first and second conduits are not shown.
Figure 2E:
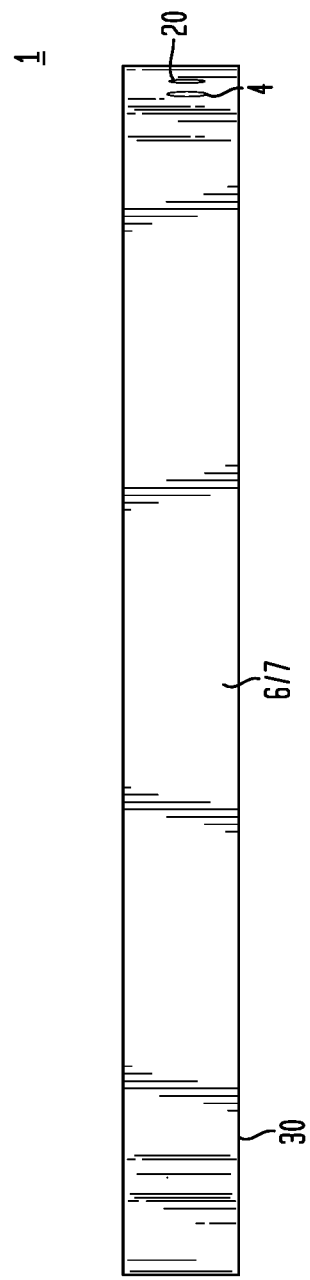
FIG. 2E is a rear view of the particular embodiment of the vessel cutdown simulant shown in FIG. 2A, whereby the first and second conduits are not shown.
Figure 2F:
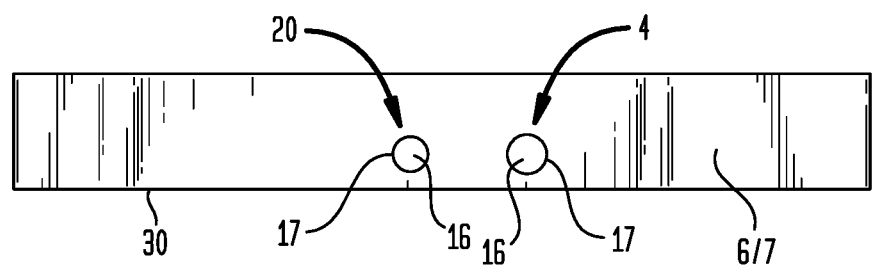
FIG. 2F is a first side view of the particular embodiment of the vessel cutdown simulant shown in FIG. 2A.
Figure 2G:
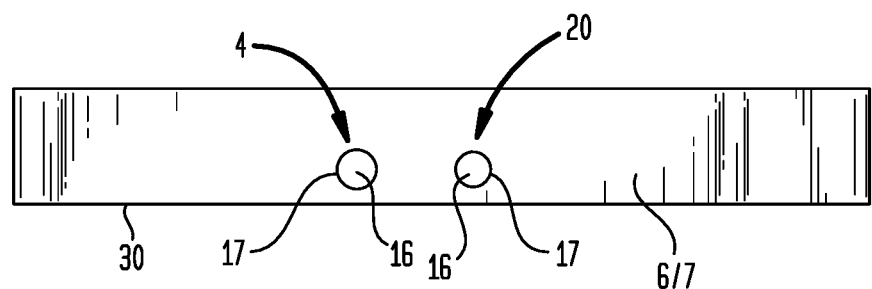
FIG. 2G is a second side view of the particular embodiment of the vessel cutdown simulant shown in FIG. 2A.

Now referring primarily to FIG. 1A and FIG. 1B, which illustrate methods of using particular embodiments of a vessel cutdown simulant (1) to practice a procedure, such as a life-saving maneuver, whereby the vessel cutdown simulant (1) includes a first layer (2), a second layer (3) (i) underlying the first layer (2) and (ii) movably engaged with the first layer (2), and at least a first conduit (4) underlying the first layer (2), whereby the first layer (2), the second layer (3), and the first conduit (4) together provide a simulated body tissue (5). The vessel cutdown simulant (1) further includes a housing (6) having at least a side wall(s) (7) which defines an interior cavity (8) configured to house or contain the simulated body tissue (5).

As used herein, the term "simulate" and derivatives thereof refer to imitating or mimicking something else, or made in imitation of something else.

Now referring primarily to FIG. 1A, as to particular embodiments, the method of using the above-described vessel cutdown simulant (1) can include coupling the vessel cutdown simulant (1) to a model (9), such as a model (9) of a simulated body or a simulated body part, and practicing the procedure on the vessel cutdown simulant (1). For example, the vessel cutdown simulant (1) can be coupled to a ventral portion of an upper torso model (9) to the right of the midline and inferior to the clavicle or collarbone (which may provide a bony landmark), whereby the vessel cutdown simulant (1) can include a first conduit (4) configured to simulate an axillary artery which conveys oxygenated blood to the upper right limb (including the arm, axilla, and shoulder). Correspondingly, this embodiment of the vessel cutdown simulant (1) may be useful for practicing a right axillary artery cutdown, which may be a life-saving maneuver.

Now referring primarily to FIG. 1B, as to other particular embodiments, the above-described vessel cutdown simulant (1) can be a wearable vessel cutdown simulant (1) and accordingly, the method of use can include attaching the wearable vessel cutdown simulant (1) to a wearer (10) via an attachment system (11) to provide a worn vessel cutdown simulant (1), and practicing the procedure on the worn vessel cutdown simulant (1). For example, the wearable vessel cutdown simulant (1) can be coupled to a ventral portion of a wearer (10) to the right of the midline and between the iliac bone and the pubic bone (which may provide bony landmarks), whereby the wearable vessel cutdown simulant (1) can include a first conduit (4) configured to simulate a femoral artery which conveys oxygenated blood to the lower right limb. Correspondingly, this embodiment of the wearable vessel cutdown simulant (1) may be useful for practicing a right femoral artery cutdown, which may be a life-saving maneuver.

As used herein, the term "wearable" means capable of being worn on a body portion of a wearer (10), whereby the instant wearable vessel cutdown simulant (1) can be worn on a body portion of a human or an animal, depending upon the application.

First Layer

Now referring primarily to FIG. 2A through FIG. 5, the first layer (2) of the simulated body tissue (5), which disposes above or over the second layer (3) and the first conduit (4), includes opposing first layer upper and lower faces (12)(13) (which can be planar or substantially planar). Further, the first layer (2) can be configured to mimic skin or an epidermis-dermis layer; thus, the first layer (2) can have a texture, thickness, durometer, color, and surface details that closely simulate a real epidermis and dermis.

Typically in animals (including humans), a real epidermis is comprised of the outermost layers of cells in the skin, whereby the epidermis can be a stratified squamous epithelium including proliferating basal and differentiated suprabasal keratinocytes which provide a barrier against the environment. The epidermis overlays the dermis, which comprises connective tissue.

To mimic skin or an epidermis-dermis layer, the first layer (2) can be formed from rubber, such as platinum-catalyzed silicone, which may have one or more of the following properties: a Shore hardness of about 00-50, a tensile strength of about 315 psi, a 100% modulus of about 12 psi, and an elongation at break of about 980%. As but one non-limiting example, the first layer (2) can be formed from ECOFLEX® 00-50, which may be obtained from Smooth-On, Inc., Macungie, Pa., United States.

As to particular embodiments, the first layer (2) can be flexible, meaning capable of being relatively easily flexed or bent as opposed to rigid or unyielding. Consequently, a flexible layer can be conformable to a nonplanar surface, or can have an amount of flex which allows the flexible layer to conform to a nonplanar surface, for example a nonplanar surface of (i) a model (9) of a simulated body or a simulated body part, or (ii) a body portion of a wearer (10) wearing the worn vessel cutdown simulant (1). Upon conforming to the nonplanar surface, the flexible layer can dispose in parallel or substantially parallel relation to the nonplanar surface.

Second Layer

Again referring primarily to FIG. 2A through FIG. 5, the second layer (3) of the simulated body tissue (5) includes opposing second layer upper and lower faces (14)(15) (which can be planar or substantially planar), whereby the second layer (3) disposes below or under the first layer (2). Correspondingly, the second layer upper face (14) can be (i) coupled to or (ii) adjacent to the first layer lower face (13). As to particular embodiments of the vessel cutdown simulant (1) having only first and second layers (2)(3), the second layer upper face (14) can be (i) directly coupled to, (ii) directly adjacent to, or (iii) engaged with the first layer lower face (13) such that there are no additional layers between the second layer upper face (14) and the first layer lower face (13).

Additionally, the second layer (3) can be movably engaged with the first layer (2), meaning that the first and second layers (2)(3) can laterally move in relation to one another during a procedure upon manipulation by a trainee, which may be advantageous for accurately mimicking that procedure. Specifically, the first layer lower face (13) can move along the second layer upper face (14) and vice versa. Notably, the movable engagement of the first and second layers (2)(3) may be in stark contrast to conventional tissue simulants, which include layers fixedly coupled, connected, or attached to one another.

The second layer (3) can be configured to mimic fat or adipose tissue; thus, the second layer (3) can have a texture, thickness, durometer, color, and surface details that closely simulate real adipose tissue, which may be perceived as having greasy, soft, and compliant tactile characteristics or the tactile characteristics of harder, denser fat tissue. Additionally, the second layer (3) can have a lesser resistance to strain in comparison to the first layer (2).

To mimic adipose tissue, the second layer (3) can be formed from rubber, such as platinum silicone rubber, which may have a lesser Shore hardness than the first layer (2) and accordingly, may be relatively softer than the first layer (2).

As but one non-limiting example, the second layer (3) can be formed from one part of DRAGON SKIN® FX-Pro (which includes one part A and one part B by weight of volume) and 0.5 parts of SLACKER®, both of which may be obtained from Smooth-On, Inc., Macungie, Pa., United States.

As to particular embodiments, the second layer (3) can be flexible, as described above for the first layer (2).

Conduit

Again referring primarily to FIG. 2A through FIG. 5, the simulated body tissue (5) further includes at least a first conduit (4) underlying the first layer (2). As to particular embodiments, the first conduit (4) can be embedded within the second layer (3) which underlies the first layer (2); hence, the first conduit (4) can be disposed between the second layer upper and lower faces (14)(15). As to other particular embodiments, the first conduit (4) can overlay the second layer (3) and specifically, the first conduit (4) can overlay the second layer upper face (14).

The first conduit (4) can be configured to contain or pass therethrough at least one flowable simulated physiological fluid which can egress from a first conduit lumen (16) upon disruption of a first conduit wall (17) defining the first conduit lumen (16).

The term "flowable" for the purposes of the present invention means capable of flowing at room temperature; not solid.

Now referring primarily to FIG. 1A, as to particular embodiments, the first conduit (4) can be coupled to a reservoir (18) containing flowable simulated physiological fluid (19).

As to particular embodiments, the first conduit (4) can be configured as simulated vasculature, such as one or more simulated blood vessels which may contain simulated blood. For example, the first conduit (4) can be configured as a simulated artery, which may be useful for practicing a procedure involving an artery cutdown, such as an axillary artery cutdown or a femoral artery cutdown.

Now referring primarily to FIG. 1A, FIG. 1B, FIG. 4, and FIG. 5, as to particular embodiments, the simulated body tissue (5) can include a plurality of conduits, such as first and second conduits (4)(20), underlying the first layer (2), whereby the second conduit (20) can be similar to the first conduit (4) in that the second conduit (20) can be configured to contain or pass therethrough at least one flowable simulated physiological fluid which can egress from a second conduit lumen upon disruption of a second conduit wall defining the second conduit lumen.

As to particular embodiments, the first conduit (4) can be configured as a simulated artery and the second conduit (20) can be configured as a simulated vein, such as an axillary vein or a femoral vein. As to these embodiments, the first conduit (4) may be relatively larger than the second conduit (20) to accurately mimic a real artery and vein pair.

Accordingly, the first conduit (4) which simulates an artery can be formed from silicone tubing having a Shore hardness of about 50 A, an inner diameter of about 0.104 inches, and an outer diameter of about 0.192 inches which can be obtained as T2012 from Qosina, Ronkonkoma, N.Y., United States. The second conduit (20) which simulates a vein can be formed from silicone tubing having a Shore hardness of about 50 A, an inner diameter of about 0.062 inches, and an outer diameter of about 0.125 inches which can be obtained as T2009, also from Qosina.

Third Layer

Figure 4:
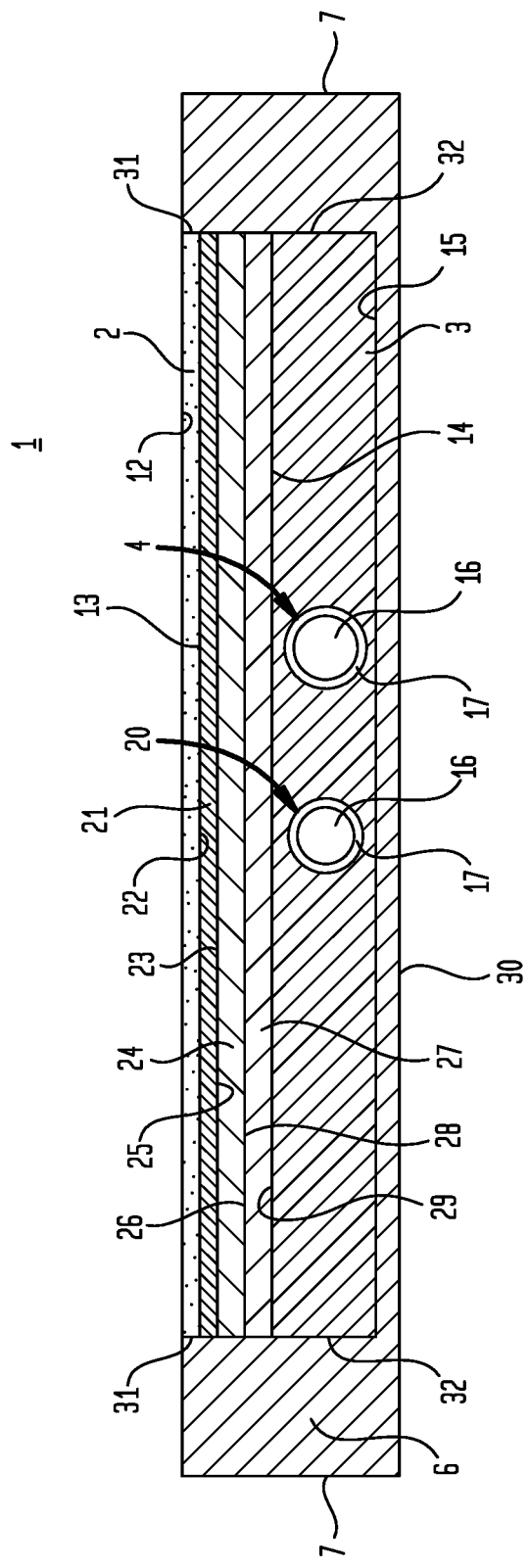
FIG. 4 is a cross sectional view of a particular embodiment of the vessel cutdown simulant having a first layer, a second layer, a third layer, a fourth layer, a fifth layer, a first conduit, and a second conduit.
Figure 5:
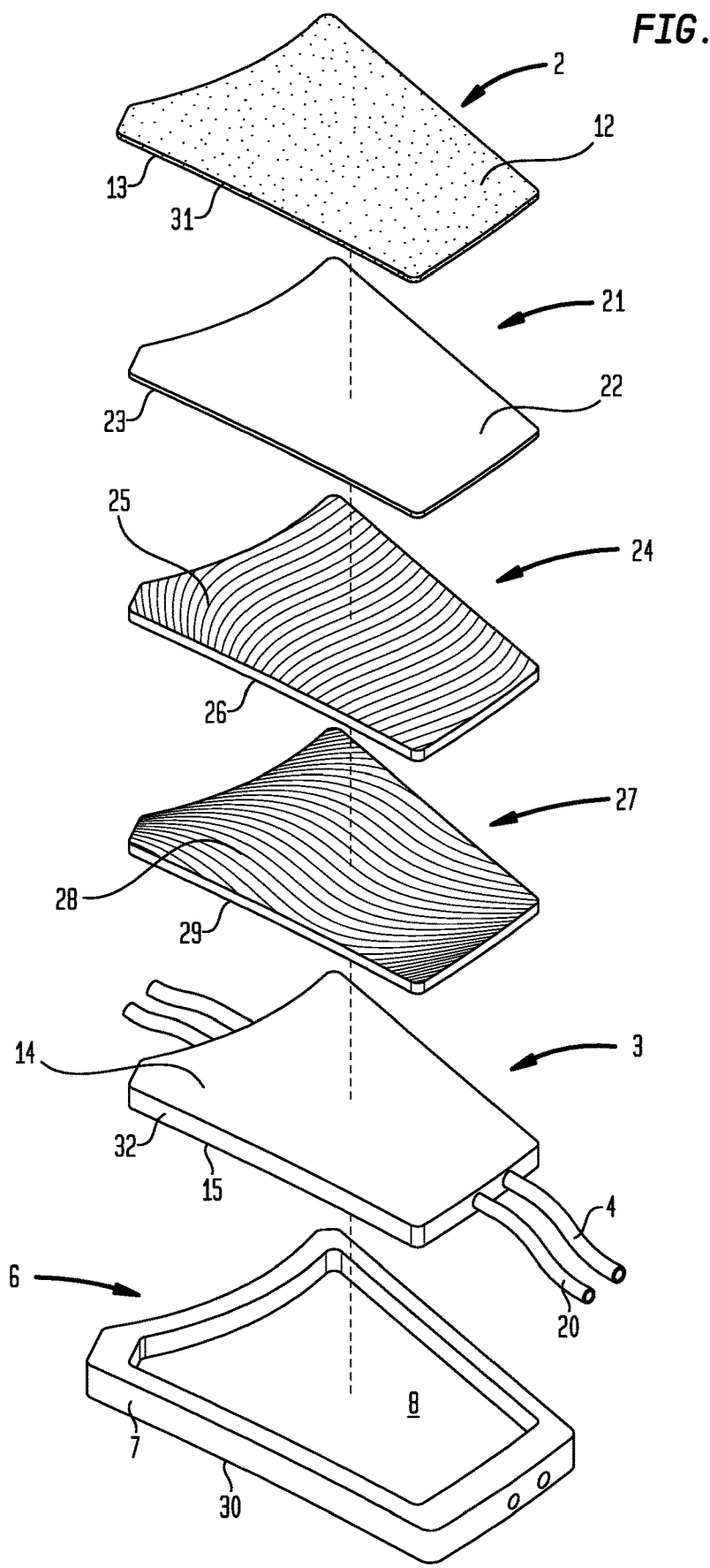
FIG. 5 is an exploded view of a particular embodiment of the vessel cutdown simulant having a first layer, a second layer, a third layer, a fourth layer, a fifth layer, a first conduit, and a second conduit.

Now referring primarily to FIG. 4 and FIG. 5, the simulated body tissue (5) can, but need not necessarily, further include additional layers which, like the first and second layers (4)(20), mimic real body tissue in both appearance and physical characteristics.

For example, as to particular embodiments, the simulated body tissue (5) can include a third layer (21) having opposing third layer upper and lower faces (22)(23), whereby the third layer (21) can (i) underlie or (ii) dispose below or under the first layer (2). Correspondingly, the third layer upper face (22) can be (i) coupled to or (ii) adjacent to the first layer lower face (13). Moreover, the third layer (21) can (i) overlay or (ii) dispose above or over the second layer (3); following, the third layer lower face (23) can be (i) coupled to or (ii) adjacent to the second layer upper face (14).

As to particular embodiments, the third layer upper face (22) can be (i) directly coupled to, (ii) directly adjacent to, or (iii) engaged with the first layer lower face (13) such that there are no additional layers between the third layer upper face (22) and the first layer lower face (13). Regarding these embodiments, in accordance with some applications, the third layer (21) can be fixedly coupled, connected, or attached (for example, via bonding) to the first layer (2) such that the first and third layers (2)(21) cannot laterally move in relation to one another. Said another way, the first layer lower face (13) cannot move along the third layer upper face (22) and vice versa. Additionally, the third layer (21) can be movably engaged with the second layer (3), meaning that the second and third layers (3)(21) can laterally move in relation to one another in the same way that the first and second layers (2)(3) can laterally move in relation to one another as described above.

As to this particular embodiment, the third layer (21) can be configured to mimic a hypodermis or subcutaneous tissue layer.

Typically in animals (including humans), a real subcutaneous tissue layer primarily comprises adipose tissue and a lesser amount of connective tissue. Accordingly, the third layer (21) can be configured like the second layer (3), as described above, having a texture, thickness, durometer, color, and surface details that closely simulate real adipose tissue.

As to particular embodiments, the third layer (21) can be flexible, as described above for the first layer (2).

Fourth Layer

Again referring primarily to FIG. 4 and FIG. 5, the simulated body tissue (5) can include a fourth layer (24) having opposing fourth layer upper and lower faces (25)(26), whereby the fourth layer (24) can (i) underlie or (ii) dispose below or under the first layer (2). Correspondingly, the fourth layer upper face (25) can be (i) coupled to or (ii) adjacent to the first layer lower face (13). Additionally, the fourth layer (24) can (i) underlie or (ii) dispose below or under the third layer (21). Moreover, the fourth layer (24) can (i) overlay or (ii) dispose above or over the second layer (3); following, the fourth layer lower face (26) can be (i) coupled to or (ii) adjacent to the second layer upper face (14).

Additionally, the fourth layer (24) can be movably engaged with the first and second layers (2)(3), meaning that the fourth layer (24) can laterally move in relation to the first and second layers (2)(3) in the same way that the first and second layers (2)(3) can laterally move in relation to one another as described above.

As to particular embodiments, the fourth layer (24) can be configured to mimic muscle tissue which can, but need not necessarily, be colored red. Also, the fourth layer (24) can include a series of ridges and valleys intended to simulate the longitudinal striations of real striated muscle tissue.

To mimic muscle tissue, the fourth layer (24) can be formed from rubber, such as platinum-catalyzed silicone, which may have one or more of the following properties: a Shore hardness of about 00-10, a tensile strength of about 120 psi, a 100% modulus of about 8 psi, and an elongation at break of about 800%. As but one non-limiting example, the fourth layer (24) can be formed from ECOFLEX® 00-10, which may be obtained from Smooth-On, Inc., Macungie, Pa., United States.

As to particular embodiments, the fourth layer (24) can be flexible, as described above for the first layer (2).

Fifth Layer

Again referring primarily to FIG. 4 and FIG. 5, the simulated body tissue (5) can include a fifth layer (27) having opposing fifth layer upper and lower faces (28)(29), whereby the fifth layer (27) can (i) underlie or (ii) dispose below or under the first layer (2). Correspondingly, the fifth layer upper face (28) can be (i) coupled to or (ii) adjacent to the first layer lower face (13). Additionally, the fifth layer (27) can (i) underlie or (ii) dispose below or under the third and fourth layers (21)(24). Moreover, the fifth layer (27) can (i) overlay or (ii) dispose above or over the second layer (3); following, the fifth layer lower face (29) can be (i) coupled to or (ii) adjacent to the second layer upper face (14).

Additionally, the fifth layer (27) can be movably engaged with the first and second layers (2)(3) (and as to particular embodiments, with the fourth layer (24)), meaning that the fifth layer (27) can laterally move in relation to the first and second layers (2)(3) (and as to particular embodiments, in relation to the fourth layer (24)) in the same way that the first and second layers (2)(3) can laterally move in relation to one another as described above.

As to particular embodiments, the fifth layer (27) can be configured to mimic muscle tissue and accordingly, can be configured like the fourth layer (24), as described above.

Again referring primarily to FIG. 4 and FIG. 5, the fourth and fifth layers (24)(27), which can each mimic muscle tissue including simulated striations, can be disposed such that the simulated striations of the fifth layer (27) are offset (for example, orthogonally offset) from the simulated striations of the fourth layer (24), which may accurately mimic the orientation of specific muscles in the body, for example the orientation of a deep muscle (as mimicked by the fifth layer (27)) relative to a superficial muscle (as mimicked by the fourth layer (24)).

As to particular embodiments, the fifth layer (27) can be flexible, as described above for the first layer (2).

Simulated Fascia Layer (s)

As to particular embodiments, the simulated body tissue (5) can include one or more additional layers, such as a layer disposed in an anatomically correct location and configured to mimic fascia, whereby real fascia comprises a band or sheet of connective tissue fibers beneath the skin which attach, stabilize, enclose, and separate muscles and other internal organs.

Housing

Now referring primarily to FIG. 2A through FIG. 5, the vessel cutdown simulant (1) further includes a housing (6) having an interior cavity (8) configured to house the simulated body tissue (5) such that the first and second layers (2)(3) can laterally move in relation to one another during a procedure upon manipulation by a trainee, as described above.

Following, the housing (6) includes a side wall(s) (7) connected to and upwardly extending from a bottom wall (30) and particularly, from a lateral periphery of the bottom wall (30), whereby the side wall(s) (7) and bottom wall (30)

can together (i) define the interior cavity (8) and (ii) bound the simulated body tissue (5) proximate to or adjacent its sides and bottom. Accordingly, the height of the side wall(s) (7) can be sufficient to bound the sides of the simulated body tissue (5) and the length and width of the bottom wall (30) can be sufficient to bound the bottom of the simulated body tissue (5).

For example, as to a particular embodiment of a vessel cutdown simulant (1) having simulated body tissue (5) comprising only first and second layers (2)(3), the side wall(s) (7) of the housing (6) can dispose adjacent to (i) the first layer sides (31) which connect the first layer upper and lower faces (12)(13) and (ii) the second layer sides (32) which connect the second layer upper and lower faces (14)(15), and the bottom wall (30) of the housing (6) can dispose adjacent to the second layer lower face (15).

As to particular embodiments, the sides of the simulated body tissue (5) can be fixedly coupled, connected, or attached to the side wall(s) (7) of the housing (6) (for example, via bonding), and/or the bottom of the simulated body tissue (5) can be fixedly coupled, connected, or attached to the bottom wall (30) of the housing (6) (for example, via bonding). Thus, the sides and bottom of the simulated body tissue (5) can be immovable in relation to the interior cavity (8) of the housing (6) while the first and second layers (2)(3) comprising the simulated body tissue (5) can be movable in relation to one another during a procedure upon manipulation by a trainee, as described above.

As to particular embodiments, the housing (6) can be formed from a material, which can be the same or different than the material which forms one or more of the layers (2)(3)(21)(24)(27) of the simulated body tissue (5), such as a rubber or rubber-like material, which may be flexible.

Penetration-Resistant Layer

As to particular embodiments, the vessel cutdown simulant (1) can, but need not necessarily, further include a penetration-resistant layer, which may be particularly useful for embodiments configured as wearable vessel cutdown simulants (1), whereby the penetration-resistant layer can preclude a sharp object from contacting and potentially penetrating the skin of the wearer (10) wearing the wearable vessel cutdown simulant (1).

As used herein, the term "penetration-resistant" denotes the ability of a material to resist penetration under normal conditions, for example the ability of a material to resist penetration by a foreign object, such as a sharp object.

Penetration-resistant material can also be puncture-resistant, whereby the material resists being punctured by a sharp object, such as a needle (and particularly, the tip of a needle), a cutting agent like a scalpel or razor blade, or the like.

As to particular embodiments, the penetration-resistant layer can be similar to the penetration-resistant layer described in U.S. patent application Ser. No. 15/833,850 titled "Wearable Simulant", which is hereby incorporated by reference in its entirety herein.

Method of Making

Now regarding production, a method of making a particular embodiment of the instant vessel cutdown simulant (1) can include: movably engaging a second layer (3) beneath a first layer (2), disposing a first conduit (4) beneath the first layer (2), whereby the first layer (2), the second layer (3), and the first conduit (4) together provide a simulated body tissue (5), and disposing the simulated body tissue (5) within an interior cavity (8) of a housing (6) configured to house the simulated body tissue (5).

The method of making the vessel cutdown simulant (1) can further include providing additional components of the vessel cutdown simulant (1) as described above and in the claims.

As to particular embodiments, the method can, but need not necessarily, further include using a mold to generate the vessel cutdown simulant (1). Further details regarding using a mold to generate the vessel cutdown simulant (1) can be found in U.S. Ser. No. 15/299,693, which is hereby incorporated by reference in its entirety herein.

As can be easily understood from the foregoing, the basic concepts of the present invention may be embodied in a variety of ways. The invention involves numerous and varied embodiments of a vessel cutdown simulant and methods for making and using such a vessel cutdown simulant.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "layer" should be understood to encompass disclosure of the act of "layering"——whether explicitly discussed or not——and, conversely, were there effectively disclosure of the act of "layering", such a disclosure should be understood to encompass disclosure of a "layer" and even a "means for layering". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Thus, the applicant(s) should be understood to claim at least: i) each of the vessel cutdown simulants herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A vessel cutdown simulant comprising:
a first layer;
a second layer underlying said first layer, said first and second layers laterally movable in relation to one another during a procedure upon manipulation by a trainee;
wherein said first layer comprises a first layer lower face, said second layer comprises a second layer upper face, said first layer lower face nonadherently engaged with said second layer upper face;
a first conduit underlying said first layer;
wherein said first layer, said second layer, and said first conduit together provide a simulated body tissue; and
a housing comprising a side wall which defines an interior cavity configured to house said simulated body tissue.

2. The vessel cutdown simulant of claim 1, wherein said first layer mimics skin.

3. The vessel cutdown simulant of claim 1, wherein said second layer mimics adipose tissue.

4. The vessel cutdown simulant of claim 1, wherein said first conduit is embedded within said second layer.

5. The vessel cutdown simulant of claim 4, wherein said first conduit disposes between said second layer upper and lower faces.

6. The vessel cutdown simulant of claim 1, wherein said first conduit overlays said second layer.

7. The vessel cutdown simulant of claim 1, wherein said first conduit is configured to contain at least one flowable simulated physiological fluid capable of egressing from a first conduit lumen upon disruption of a first conduit wall defining said first conduit lumen.

8. The vessel cutdown simulant of claim 7, further comprising a reservoir coupled to said first conduit;
wherein said reservoir is configured to contain said flowable simulated physiological fluid.

9. The vessel cutdown simulant of claim 1, further comprising a second conduit underlying said first layer.

10. The vessel cutdown simulant of claim 9, wherein said first conduit mimics an artery and said second conduit mimics a vein.

11. The vessel cutdown simulant of claim 10, wherein said first conduit comprises a greater inner diameter than said second conduit.

12. The vessel cutdown simulant of claim 1, further comprising a third layer underlying said first layer.

13. The vessel cutdown simulant of claim 12, wherein:
said first layer comprises opposing first layer upper and lower faces;
said third layer comprises opposing third layer upper and lower faces; and
said third layer upper face is directly coupled to said first layer lower face.

14. The vessel cutdown simulant of claim 13, wherein said third layer is fixedly coupled to said first layer.

15. The vessel cutdown simulant of claim 13, wherein said third layer mimics a subcutaneous tissue layer.

16. The vessel cutdown simulant of claim 15, further comprising a fourth layer underlying said first layer.

17. The vessel cutdown simulant of claim 16, wherein said fourth layer mimics muscle tissue.

18. The vessel cutdown simulant of claim 17, further comprising a fifth layer underlying said first layer.

19. The vessel cutdown simulant of claim 18, wherein said fifth layer mimics muscle tissue.

20. The vessel cutdown simulant of claim 1, wherein sides of said simulated body tissue are fixedly coupled to said side wall of said housing.

* * * * *